April 1, 1930.  H. C. ROOF  1,752,615
WINDSHIELD CLEANER AND HEATER
Filed Jan. 24, 1928
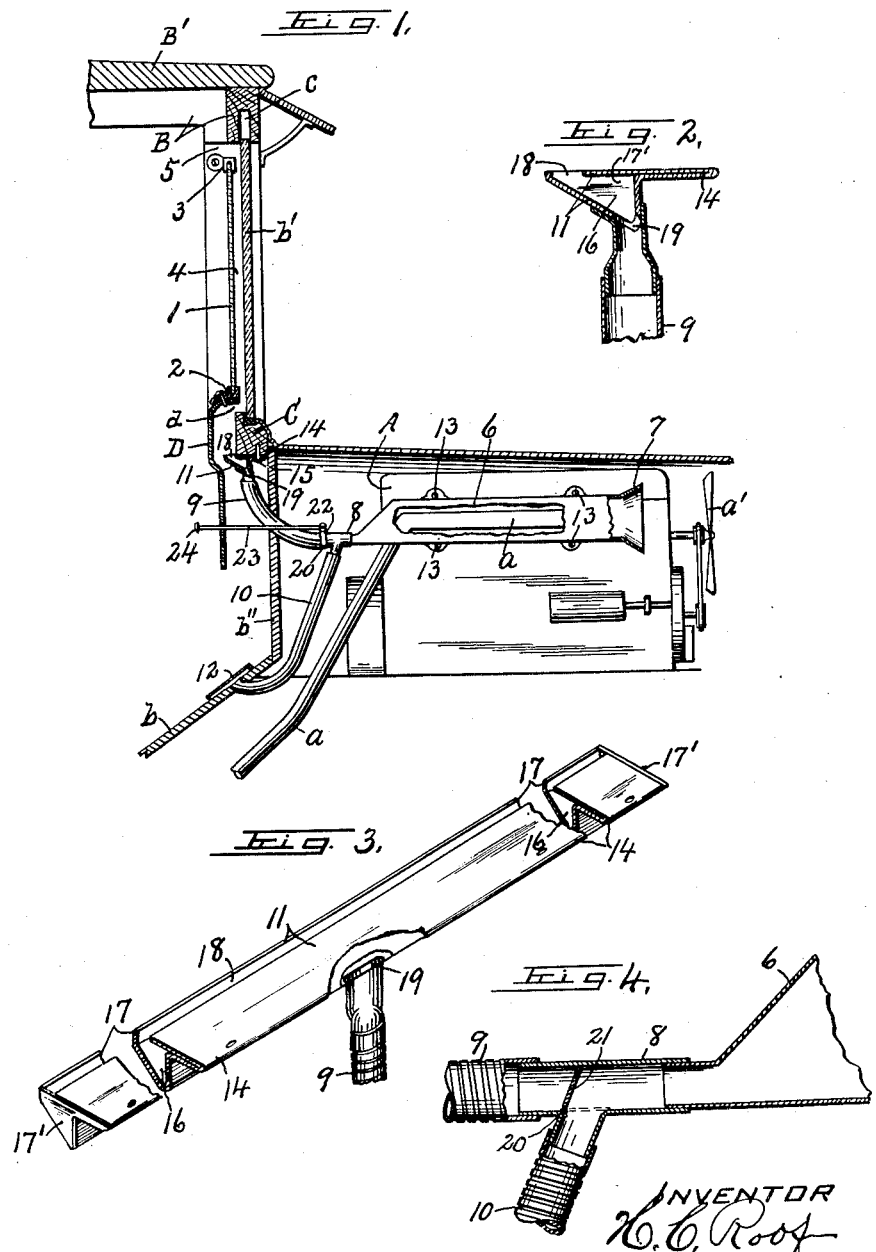

Patented Apr. 1, 1930

1,752,615

UNITED STATES PATENT OFFICE

HAROLD C. ROOF, OF ADAMS CENTER, NEW YORK

WINDSHIELD CLEANER AND HEATER

Application filed January 24, 1928. Serial No. 249,024.

This invention relates to a device for distributing heated air or gases across a windshield glass to prevent the accumulation of sleet, snow and ice thereon and preferably makes use of the heat developed by the exhaust products of combustion from the internal combustion engines commonly used in road vehicles.

The main object is to distribute the heated air or gases over substantially the entire area of the windshield glass or at least over a greater area than has heretofore been practised so as to maintain a clear vision through practically all parts of the windshield glass.

A further object is to support a distributing head for the heated air wholly below the lower edge of the windshield glass so as to avoid obstruction to the forward vision through all parts of said glass and at the same time to allow the heated air to gravitate upwardly from the distributing head across practically the entire inner or rear surface of the glass where it is protected more or less from rearwardly deflection by currents of air impinging against the front face of the glass, particularly when the car is in motion.

Another object is to provide the same device with means whereby the air heated by the exhaust may be diverted wholly or in part from the distributing head to a suitable register in the floor board of the car for heating the interior of said car.

An additional object is to place a supplemental transparent plate across the inner or rear face of the windshield plate in spaced relation thereto to form an intervening chamber for directing the heated air across the windshield glass.

Other objects and uses relating to specific parts of the device will be brought out in the following description.

In the drawings:—

Figure 1 is a longitudinal vertical sectional view of the front portion of a closed car equipped with my improved warming device for the windshield glass and floor-board register.

Figure 2 is an enlarged transverse vertical sectional view through the distributing head and adjacent portion of the conduit for supplying heated air thereto.

Figure 3 is a perspective view, partly broken away, of the detached distributing head and adjacent portion of the warm air supply pipe leading thereto.

Figure 4 is an enlarged detail sectional view of the rear end of the heater jacket and adjacent portions of the branch pipes leading therefrom to the distributing head and to the foot warming register respectively.

In order that the invention may be clearly understood I have shown a portion of a vehicle having a conventional internal combustion engine —A— and exhaust manifold or pipe —a— for receiving the highly heated exhaust products of combustion from the engine and conducting them downwardly and rearwardly beneath the floor to the rear of the car in the usual manner, said engine being also provided with a fan —a'— driven by any suitable means from the crank shaft of the engine and preferably located at the front end thereof.

The frame or body as —B— of the car is provided with the usual foot board —b— and also with the conventional form of windshield glass or plate —b'— extending across the front end from side to side thereof.

As illustrated, the windshield plate —b'— is normally seated along its lower edge upon a buffer-lined ledge —C— and is movable vertically in a guide slot —c— in the upper front portion of the frame —B—, which latter is provided with the usual top —B'— commonly used in closed or semiclosed cars.

An instrument board or cowl plate —D— is secured in the front portion of the frame —B— to extend across the rear face and some distance above and below the upper and lower edges of the ledge —C— in spaced relation to form an intervening air passage —d— leading from a level below the ledge —C— to a level slightly above the upper edge of said ledge for receiving the heated air which may be delivered thereto from the heating jacket, presently described.

The windshield plate —B— is, of course, transparent and usually made of glass, but obviously might be made of any other suitable transparent material and, when raised from its seat on the ledge —C—, permits circulation of atmospheric air rearwardly and downwardly through the chamber or passage —d— between the instrument board —D— and ledge —C—.

An additional or extra transparent plate —1— of glass or other suitable material and of slightly less area than the windshield glass —B'— is secured in position in the frame —B— parallel with and in slightly spaced relation to the inner or rear face of the windshield glass to extend approximately the full length thereof, but is of sufficiently less vertical width than the windshield glass to afford an inlet opening at the bottom communicating with the passage —d— and an outlet opening at the top communicating with the interior of the body of the car. That is, the lower edge of the supplemental plate —1— is seated in a longitudinally-grooved member —2— which, in turn, is bolted or otherwise secured to the upper edge of the instrument board —D—.

The upper edge of this supplemental plate —1— is secured in a grooved member —3— which, in turn, is secured to the upright posts on opposite sides of the front of the body frame —B— as shown more clearly in Figure 1.

The purpose in placing this supplemental plate —1— in slightly spaced relation to the inner or rear face of the windshield glass —d'— is to form an air-circulating chamber —4— communicating at its lower side with the passage —d— for receiving and confining the heated air, which may be delivered thereto through the passage —d—, against rearward deflection or dissipation by currents of air which may impinge against the windshield glass, particularly while the car is in motion.

As the heated air rises in the chamber —4— it is distributed more or less evenly across the greater portion of the area of the windshield glass to apply sufficient heat thereto to prevent the accumulation of sleet, snow and ice thereon, the heated air being free to escape by its lighter specific gravity through the outlet as —5— to the interior of the car between the upper edge of the supplemental plate —1— and upper cross bar of the frame —B— as shown in Figure 1.

A portion of the exhaust conduit —a— is inclosed by a suitable housing or conduit —6— extending lengthwise thereof and having its front end opened and flared at —7— to receive atmospheric air as it may be forced rearwardly by the fan —a'—.

The rear end of the housing or jacket —6— is provided with a reduced outlet —8— to which is connected flexible branch pipes —9— and —10— for delivering the heated air to a distributing head —11— and to a floor register —12— respectively, the housing or jacket —6— being of greater interior cross sectional area than the exhaust pipe —a— which it incloses to allow free circulation of air from the inlet —7— to the outlet —8—.

The housing or jacket —6— may be secured by screws or bolts —13— to the adjacent side of the frame of the engine to inclose the exhaust pipe —a— and to hold it in fixed spaced relation thereto.

The distributing head —11— for the heated air preferably is made in the form of a trough-shaped conduit of sheet metal of approximately the full length of the windshield glass —b'— and is provided along its upper side with a laterally projecting flange —14— which is secured by screws or other suitable fastening means —15— to the underside of the ledge —C— so as to project rearwardly beyond the front edge of said ledge.

This distributing head —11— is provided with a V-shaped trough —16— extending lengthwise thereof from end to end except that the ends of the trough are closed by end walls —17—, Figure 3.

The top of the flange —14— is extended rearwardly partially across the upper side of the groove or channel —16— while the rear side of the same trough is deflected upwardly at —17— to about the same level as the upper face of the flange —14— but in spaced relation to the rear edge thereof to form a longitudinal groove —18— extending from end to end of the distributing head —11— and communicating with the trough —16—.

It will be seen from the foregoing description that the rear wall —17— of the slot —18— projects slightly beyond the rear edge of the ledge —C— and that it is slightly separated from the front face of the instrument board —D— so as to leave a clear open passage between the distributing head and instrument board for the circulation of cold air downwardly from the passage —d— into the interior of the car when the windshield glass —b'— is opened.

On the other hand, when the car is driven in sleet, ice or snow the windshield glass —b'— will be closed and the warm air from the housing —6— will be conducted through the branch pipe —9— and thence into the trough —16— from which it may escape through the slot —18— (into the passage —c—) and thence upwardly through the chamber —4— between the windshield glass —b'— and supplemental plate —1—.

In order to obtain a more even distribution of the heated air through and from end to end of the trough —16— and thence outwardly through the slot —18— of the distributing head the conduit or pipe —9— is connected to the underside of the distributing head substantially midway between its ends to communicate through a relatively small and narrow opening —19— with the trough —16—.

The reason for making the pipe —9— flexible is to permit different portions thereof to be deflected in different directions as may be required for attachment to the outlet —8— of the housing —6— and to the central portion of the distributing head.

The branch pipe —10— is also flexible for the same purpose and extends downwardly and rearwardly beneath the footboard —b— for connection with the warm air register —12—.

Suitable means is provided for diverting the warm air wholly, or in part, from one branch pipe to the other and, for this purpose, a relatively small crank shaft —20— is journaled in the outlet —8— at the junction of the lower and rear sides of the branch pipes —9— and —10—, said rock shaft being provided with a damper —21— movable from a position across the outlet leading to the pipe —9— and also to and from a position across the adjacent end of the branch pipe —10—, as shown more clearly in Figure 4.

This rock shaft is provided with an external crank arm —22— to which is connected one end of an operating rod —23— extending through registering openings in the front dashboard as —b″— of the body of the car and the instrument board or cowl —D—, the rear end of said rod being provided with a handle —24— by which it may be operated to move the damper —21— to different positions or from the position shown by full lines to the position shown by dotted lines in Figure 4 and vice versa.

Operation

When it is desired to direct heated air from the housing or conduit —6— to the distributing head —11— the damper —21— will be adjusted to the position shown by dotted lines in Figure 4, thus permitting the free passage of the heated air through the pipe —9— and the distributing head —11— into the chamber or passage —d— and thence upwardly through the chamber —4— between the plates —b′— and —1— from which it is free to escape through the outlet passage —5— over the top of the plate —4— and into the interior of the car.

This traversing and more or less confining of the heated air through and into the chamber —4— causes the transfer of said heat to the windshield glass —b′— to a sufficient degree to prevent the accumulation of sleet, ice or snow upon the front face of the windshield glass, thus permitting a clear forward vision through both of the plates —1— and —b′— throughout the entire area thereof.

On the other hand, if no sleet, ice or snow are present in the vicinity of the car and it is desired to warm the interior of said car the damper —21— may be adjusted to the position shown by full lines in Figure 4 to divert the heated air from the housing —6— through the conduit —10— and to the register —12— connected thereto.

The register may be of any conventional type having the usual adjustable grid or damper for controlling the outlet of the warm air therethrough as may be required.

It is also evident that under some conditions the damper —21— may be adjusted to an intermediate position to permit part of the heated air to go through the distributing head —11— and another part to flow to the register —12— thereby performing the double function of preventing the accumulation of sleet, ice and snow on the windshield glass and also of heating the interior of the car.

It will be observed that when the car is in motion the atmospheric air will be forced either by the motion of the car or by the fan —a— into the front end of the pipe or housing —6— and will then be heated in transit through said housing to be distributed in this heated condition either to the head —11— or to the register —12— or to both the head and register according to the adjustment of the damper —21—.

What I claim is:—

1. In a device for supplying heated air to windshield plates of motor vehicles, the combination with a transparent windshield plate, an extra transparent plate across the rear face of the windshield plate in spaced relation thereto to form an intervening chamber, said extra plate having its upper and lower longitudinal edges spaced from the windshield plate to form an inlet and an outlet opening for said chamber, said openings extending substantially the full length of the extra plate, a distributing head extending approximately the full length of the extra plate positioned in a plane below the lower edge thereof and provided with an opening in its upper surface extending from end to end for discharging heated air through said chamber, and means for introducing a heating medium into said head.

2. In a device for supplying heated air to windshield plates of motor vehicles, the combination with a transparent windshield plate, an extra transparent plate across the rear face of the windshield plate in spaced relation thereto to form an intervening chamber, said extra plate having its upper and lower longitudinal edges spaced from the windshield plate to form an inlet and an outlet opening for said chamber, said openings extending substantially the full length of the extra plate, an approximately V-shaped header positioned adjacent the bottom longitudinal edge of the windshield plate, a horizontal baffle plate extending over the top of the header and having one edge in spaced relation to one longitudinal edge of the heater, a conduit in communication with the lower portion of the header at approximately the center part thereof, and means for introducing a heating medium into said conduit.

3. In a device for supplying heated air to the windshield plate of motor vehicles having an internal combustion engine, the combination with a transparent windshield plate, an extra transparent plate across the rear face of the windshield plate in spaced relation thereto to form an intervening chamber, said extra plate having its upper and lower longitudinal edges in spaced relation from the windshield plate to form an inlet and an outlet opening for said chamber, said openings extending substantially the full length of the extra plate, a distributing head extending approximately the full length of the extra plate in a plane below the lower edge thereof and provided with an opening extending from end to end for discharging heated air through said chamber, a conduit receiving heat from the exhaust of the engine, said conduit being provided with an outlet for the heated air, and a pipe connected at one end to said outlet and having the other end connected with said head at approximately the central portion thereof for introducing heated air into said head.

In witness whereof I have hereunto set my hand this 13th day of January, 1928.

HAROLD C. ROOF.